United States Patent [19]

Reid et al.

[11] 4,439,465

[45] Mar. 27, 1984

[54] METHOD OF MAKING A LIGHT WEIGHT BATTERY PLAQUE

[75] Inventors: Margaret A. Reid; Robert E. Post, both of Bay Village; Daniel G. Soltis, Broadview Heights, all of Ohio

[73] Assignee: The United States of America as represented by the Administrator of the National Aeronautics and Space Administration, Washington, D.C.

[21] Appl. No.: 350,476

[22] Filed: Feb. 19, 1982

[51] Int. Cl.³ .......................... B05D 5/12; H01M 6/00
[52] U.S. Cl. .................................... 427/115; 29/623.5; 427/125; 427/126.6; 427/296; 427/306; 429/223; 429/234
[58] Field of Search ............... 29/623.5; 427/296, 306, 427/115, 125, 126.6; 429/223, 234

[56] References Cited

U.S. PATENT DOCUMENTS

| | | | |
|---|---|---|---|
| 3,318,730 | 5/1967 | Kreiselmaier | 427/115 |
| 3,489,590 | 1/1970 | Herwig | 427/306 |
| 3,560,262 | 2/1971 | Baba et al. | 429/234 |
| 3,671,291 | 6/1972 | Miller et al. | 427/306 |
| 4,356,242 | 10/1982 | Doniat | 429/234 |

FOREIGN PATENT DOCUMENTS 745578 11/1966 Canada ............................. 427/296

*Primary Examiner*—Howard N. Goldberg
*Assistant Examiner*—P. W. Echols
*Attorney, Agent, or Firm*—Norman T. Musial; John R. Manning; James A. Mackin

[57] ABSTRACT

A nickel plaque which may be coated with a suitable metal or compound to make an electrode for a fuel cell or battery is fabricated by directing nickel sensitizer, catalyst and plating solutions through a porous plastic substrate in the order named and at prescribed temperatures and flow rates. A boride compound dissolved in the plating solution decreases the electrical resistance of the plaque. Certain substrates may require treatment in an alkali solution to dissolve filler materials thereby increasing porosity to a required 65%.

14 Claims, 1 Drawing Figure

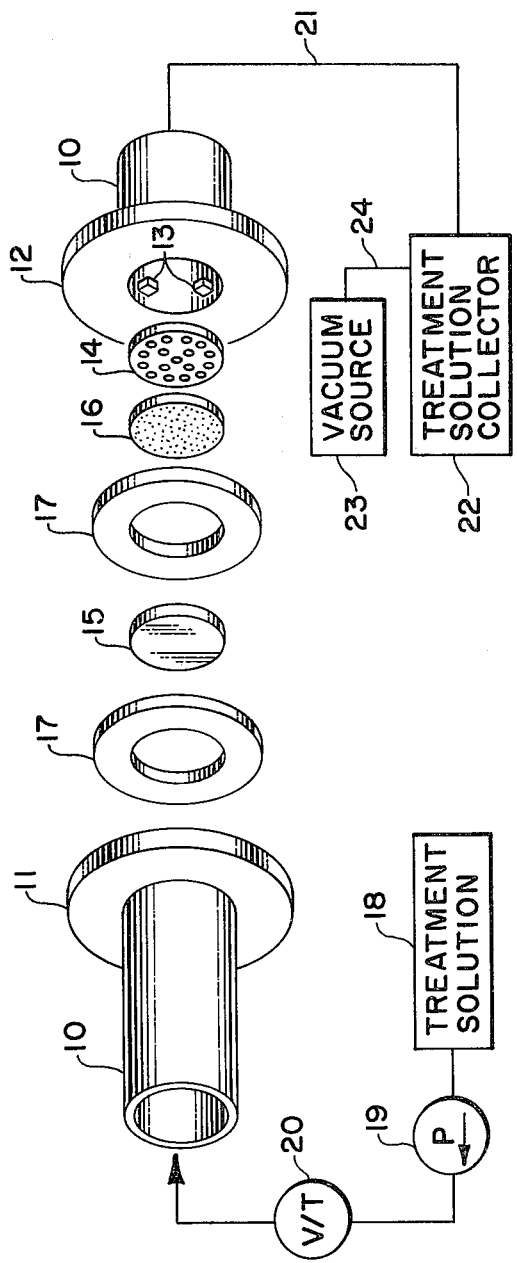

METHOD OF MAKING A LIGHT WEIGHT BATTERY PLAQUE

DESCRIPTION

ORIGIN OF THE INVENTION

The invention described herein was made by employees of the United States Government and may be manufactured or used by or for the Government without the payment of any royalties thereon or therefor.

TECHNICAL FIELD

This invention relates to electrochemical devices and is directed more particularly to electrodes for such devices.

Electrodes for many fuel cells and electrochemical cells are made by plating a material such as nickel, silver, cadmium, platinum or other suitable well-known metals over a porous metal plaque or by depositing a compound such as nickel hydroxide in the plaque. Commercial plaques are commonly made by sintering nickel particles. Such commercial plaques are relatively heavy but lightweight plaques have been made by nickel-plating carbon felt and nylon felt.

In certain applications such as space vehicles or satellites, low weight of all components is of extreme importance. Thus, manufacturers of batteries and fuel cells to be used in aeronautical or space vehicles seek to reduce the weight of these electrochemical devices as much as possible.

As indicated previously, some advances have been made in reducing the weight of electrodes by providing plaques such as nickel-plated carbon or nylon felt. These felts, in general, have an uneven distribution of nickel therein, with the nickel having much greater density at the outside surfaces. There are also problems involving loss of the nickel material from the plaque.

BACKGROUND ART

U.S. Pat. No. 3,701,675 to Kallrath et al discloses a method for applying metal coatings to non-conductors by an electroless method wherein the non-conductor is dipped into an electroless plating solution.

U.S. Pat. No. 3,326,719 to Beltzer et al relates to a method of metal coating non-conductive porous and non-porous substrates. Beltzer et al, in one embodiment, utilized a vacuum to draw a reactive dye material and a metallizing solution through a catalyzed porous carbon body to prepare an electrode.

U.S. Pat. No. 3,351,487 to Levine et al discloses a process for plating a permeable membrane with an electrically conductive metallic film. The metallic coating is deposited on the interior of hollow fibers by flowing a reducing agent through the interior of each fiber while a metal ion solution contains the exterior surface. The metal ion solution penetrates the pores of the fiber and contacts the reducing agent, causing metal to deposit on the interior of the fiber.

U.S. Pat. No. 3,560,262 of Babba et al is concerned with a battery electrode composed of a porous fabric base such as nonwoven nylon on which there is nonelectrolytically plated a thin coating of a conductive metal. A metal coating is applied by dipping a fabric base in an electroless plating solution to produce a relatively thick metallic coating.

U.S. Pat. No. 4,002,779 to Nischwitz discloses that a relatively thick coating of metal, such as nickel, is plated over a thin coating of conductive metal which has been non-electrolytically plated onto a porous fabric such as nonwoven nylon.

U.S. Pat. No. 2,626,294 to Brennan discloses a storage battery electrode comprising a nickel coating on a porous electrolytically inert structure such as asbestos or porous poly-styrene. Metal deposition in the Brennan patent is accomplished by electroplating.

DISCLOSURE OF THE INVENTION

According to the present invention, a flexible, porous, platable, plastic substrate is backed-up by a porous, nonplatable diffuser which, in turn, is in contact with an apertured, nonplatable support member. A substrate, the diffuser and the apertured support are sandwiched together with suitable rubber gaskets in a conduit.

Using either pressure or a vacuum, the various chemicals required to form a metal deposit evenly and uniformly in the substrate are directed through the conduit. Specific flow rates and temperatures for the chemicals are required.

The flexible, porous, platable, plastic substrate may be of the type wherein a soluble filler material must be removed to form pores as a first step in the process of the instant invention.

BRIEF DESCRIPTION OF THE DRAWING

The details of the invention will be described in connection with the accompanying drawing which is a schematic diagram of the apparatus of the instant invention.

BEST MODE FOR CARRYING OUT THE INVENTION

Referring now to the single FIGURE, there is shown in accordance with the invention a conduit 10 which is separable into two sections at annular flanges 11 and 12. A plurality of bosses or pegs 13 are provided in conduit 10 adjacent the flange 12 to limit the position of an apertured, polyvinyl chloride (PBC) support plate 14.

A substrate 15 which is to be made into a plaque is placed against a diffuser plate 16 which is a non-palatable plastic or carbon material having a substantially greater porosity than the substrate. Ideally, the average pore size in the diffuser 16 is about twice as great as that of the substrate 15. One or more gaskets such as rubber gaskets 17 are disposed between the flanges 11 and 12 with the substrate 15, the diffuser 16 and the apertured support 14 and the flanges clamped together by suitable means such as bolts, clamps or the like (not shown).

The various treatment solutions required to deposit metal in the substrate 15 by electroless plating are directed through the conduit 10 in a direction from left to right as viewed in the drawing. The treatment solution may be pumped under pressure from a container 18 by means of a pump 19 through a throttle valve 20 into conduit 10 where it passes through the substrate 15, the diffuser 16 and the apertured support plate 14 in that order. From the other end of conduit 10, the treatment fluid flows through a conduit 21 to a treatment solution collector 22.

Preferably, the treatment solution is drawn from container 18 by means of a vacuum source 23 which may be connected to treatment solution collector 22 through a conduit 24. It will be clear, of course, that for the vacuum source to draw the treatment fluid through conduit 10, treatment solution collector 22 must be sealed.

The procedure for preparing a lightweight nickel battery plaque will now be described in several examples.

EXAMPLE NO. 1

A three-inch diameter sample of Amerace A-40, 31 mils in thickness obtained from Amerace Corporation, Butler, New Jersey, and having imbedded therein an expanded nickel grid was heated in 45% KOH for at least six hours at a temperature of between 75° C. and 85° C. to remove an alkali-soluble filler material, thereby forming pores in the sample. This sample, which is to serve as the substrate for making the plaque, is thoroughly rinsed with tap water and then with distilled water. Referring to the FIGURE, substrate 15 is disposed as shown with diffuser 16 and apertured support plate 14 in conduit 10 and the flanges 11 and 12 are clamped together.

The various treatment solutions identified below were obtained from Allied Kelite Division, Richardson Company, Des Plaines Illinois. The solution quantities, flow times, temperatures, and rates are as follows:

| Solution | Temp. °C. | Volume | Flow Rate |
|---|---|---|---|
| Allied Kelite Sensitizer #261 | 20–30 | 190–210 cc | 150–170 cc/min |
| Distilled H$_2$O | 20–30 | 470–530 cc | 90–110 cc/min |
| Allied Kelite Catalyst #262 | 36–46 | 190–210 cc | 40–60 cc/min |
| Distilled H$_2$O | 20–30 | 470–530 cc | 90–110 cc/min |
| Allied Kelite Plating Bath #755 | 55–65 | 470–530 cc | at least 40 cc/min reflow as needed |

The nickel plating bath is passed through substrate 15 until the desired amount of nickel is deposited. This is determined by the weight increase of the substrate and is normally 0.02 to 0.03 grams per square centimeter of substrate projected area, where the substrate porosity is at least 65%.

EXAMPLE 2

The procedure followed is similar to that of Example 1 but the substrate material is heated in 45% KOH for about 10 hours at 80° C. to remove the filler material. The substrate material has a porosity of approximately 90%. The solution quantities, temperatures, and flow rates are as follows:

| Solution | Temp | Volume | Flow Rate |
|---|---|---|---|
| Allied Kelite Sensitizer #261 | 25° C. | 200 cc | 160 cc/min |
| Distilled H$_2$O | 25° C. | 500 cc | 100 cc/min |
| Allied Kelite Catalyst #262 | 41° C. | 200 cc | 50 cc/min |
| Distilled H$_2$O | 25° C. | 500 cc | 100 cc/min |
| Allied Kelite Plating Bath #755 | 60° C. | 500 cc | at least 40 cc/min; reflow as needed |

The weight gain of the plastic was 0.024 g/cm$^2$. Electrochemical impregnation produced an electrode which was cycled to 100% DOD (depth of discharge) for 14 cycles at current densities of up to 100 mA/cm$^2$ without loss of capacity.

While the sensitizer, catalyst and nickel plating bath of the foregoing examples were obtained from one company, other similar solutions for electroless nickel plating are available commercially from a number of other companies. Also, the substrate may be any flexible, platable plastic material having the desired porosity of at least 65%. Polyolefin and polytetrachloroethylene materials can be used with the present invention but require an extra step by which they are first etched.

It has been found that nickel plating solutions containing boride compounds produce plaques which have lower electrical resistance which is highly desirable for fuel cell or battery electrodes. Accordingly, it is preferred that a nickel electroless plating solution contain one or more boride compounds when making a plaque in accordance with the instant invention.

It will be understood the changes and modifications may be made to the foregoing described invention by those skilled in the art without departing from the sphere and scope of the invention as set forth in the claims appended hereto.

What is claimed is:

1. A method of making a nickel battery plaque comprising the steps of:
   providing a flexible, platable, plastic substrate having a nickel wire grid embedded therein and having a porosity greater than 65%;
   providing a perforated non-platable support member;
   providing a non-platable diffuser having a porosity substantially greater than that of said substrate;
   sandwiching said diffuser between said substrate and said support member and in contact with each;
   flowing through said substrate, said diffuser and said support plate in that order the following solutions in the order named:
   a nickel plating sensitizer solution;
   water;
   a nickel plating catalyst solution;
   water; and
   a nickel electroless plating solution.

2. The method of claim 1 wherein said plating solution contains a boride compound.

3. The method of claim 1 wherein said substrate is filled and including the step of removing the material with which the plastic is filled prior to the substrate being placed in contact with said diffuser whereby said substrate is made porous.

4. The method of claim 3 wherein said filler is alkali soluble and is removed by subjecting said substrate to 45% KOH at about 75° C. to about 85° for at least 6 hours, then washing said substrate with water to remove any residue.

5. The method of claim 1 wherein the solutions and the distilled water are subject to the following conditions:

| Solution | Temp. °C. | Volume | Flow Rate |
|---|---|---|---|
| Sensitizer | 20–30 | 190–310 cc | 150–170 cc/min |
| Distilled Water | 20–30 | 470–530 cc | 90–110 cc/Min |
| Catalyst | 36–46 | 190–210 cc | 40–60 cc/min |
| Distilled Water | 20–30 | 470–530 cc | 90–110 cc/min |
| Nickel Plating Bath | 55–65 | 470–530 cc | at least 40 cc/min reflow as needed | the substrate having an area of about 7.5 square inches and a thickness of about 31 mils (millimeters).

6. The method of claim 5 wherein the plating bath is passed through said substrate at least twice.

7. The method of claim 5 wherein said nickel plating is carried out for a time sufficient to increase the weight of said substrate by 0.02 to 0.03 grams of nickel per cm$^2$ of substrate area.

8. The method of claim 7 wherein the nickel deposited is in the amount of about 0.024 grams per cm$^2$ of substrate area.

9. The method of claim 1 wherein the solutions and the water are subject to the following approximate conditions:

| Solution | Temp. °C. | Volume | Flow Rate |
|---|---|---|---|
| Sensitizer | 25 | 200 cc | 160 cc/min |
| Distilled Water | 25 | 500 cc | 100 cc/min |
| Catalyst | 41 | 200 cc | 50 cc/min |
| Distilled Water | 25 | 500 cc | 100 cc/min |
| Nickel Plating Bath | 60 | 500 cc | At least 40 cc/min |
| | | | reflow as needed | for a substrate having an area of about 7.5 square inches and a thickness of about 31 mils.

10. The method of claim 1 wherein the last step is continued until 0.02 to 0.03 grams of nickel per cm$^2$ of substrate area is deposited.

11. The method of claim 10 wherein said plating solution contains a boride compound which increases the electrical conductivity of said battery plaque.

12. The method of claim 1 wherein the porosity of said substrate is about 90%.

13. The method of claim 1 wherein the substrate weight increases by 0.024 gm/cm$^2$ due to the plating.

14. The method of claim 1 wherein the porosity of said diffuser is at least 80%.

* * * * *